(12) United States Patent
Jang

(10) Patent No.: US 10,322,710 B1
(45) Date of Patent: Jun. 18, 2019

(54) METHOD FOR CONTROLLING MILD HYBRID VEHICLE

(71) Applicants: Hyundai Motor Company, Seoul (KR); Kia Motors Corporation, Seoul (KR)

(72) Inventor: Hwa Yong Jang, Hwaseong-si (KR)

(73) Assignees: Hundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/013,080

(22) Filed: Jun. 20, 2018

(30) Foreign Application Priority Data

Dec. 18, 2017 (KR) .................. 10-2017-0174094

(51) Int. Cl.
*B60K 6/26* (2007.10)
*B60W 20/10* (2016.01)
*B60K 6/485* (2007.10)

(52) U.S. Cl.
CPC ............. *B60W 20/10* (2013.01); *B60K 6/26* (2013.01); *B60K 6/485* (2013.01); *B60K 2006/268* (2013.01); *B60W 2510/0633* (2013.01); *B60W 2510/0657* (2013.01); *B60W 2510/0676* (2013.01); *B60W 2510/244* (2013.01); *B60W 2710/0627* (2013.01); *B60W 2710/083* (2013.01)

(58) Field of Classification Search
CPC .......... B60W 20/10; B60W 2510/244; B60W 2510/0657; B60W 2510/0676; B60W 2510/0633; B60W 2710/083; B60W 2710/0627; B60K 6/26; B60K 6/485; B60K 2006/268
See application file for complete search history.

(56) References Cited

U.S. PATENT DOCUMENTS

| 2009/0038585 | A1* | 2/2009 | Andri | B60K 6/24 123/406.3 |
| 2010/0284824 | A1* | 11/2010 | Hippen | F01M 11/02 417/44.1 |
| 2012/0208672 | A1* | 8/2012 | Sujan | B60W 10/02 477/5 |
| 2013/0247561 | A1* | 9/2013 | Russ | F02B 37/007 60/602 |
| 2014/0060006 | A1* | 3/2014 | Ruona | F02B 37/183 60/273 |
| 2015/0159545 | A1* | 6/2015 | Cowgill | F02B 37/002 60/602 |
| 2015/0369179 | A1* | 12/2015 | Hotta | F02D 41/0065 123/568.12 |
| 2017/0058840 | A1* | 3/2017 | Wu | F02B 37/004 |
| 2018/0171917 | A1* | 6/2018 | Ulrey | F02M 26/14 |

* cited by examiner

*Primary Examiner* — Erez Gurari
(74) *Attorney, Agent, or Firm* — Morgan, Lewis & Bockius LLP

(57) ABSTRACT

A method for controlling a mild hybrid vehicle may include determining, by a controller, whether an engine of the mild hybrid vehicle operates based on a demand torque of a driver of the mild hybrid vehicle; determining, by the controller, a torque of a starter-generator of the mild hybrid vehicle that assists a torque of the engine according to the demand torque of the driver based on a temperature of a turbocharger of the mild hybrid vehicle when the engine is operated; and operating, by the controller, the starter-generator to assist the torque of the engine based on the determined torque of the starter-generator.

10 Claims, 5 Drawing Sheets

METHOD FOR CONTROLLING MILD HYBRID VEHICLE

CROSS-REFERENCE TO RELATED APPLICATION

The present application claims priority to Korean Patent Application No. 10-2017-0174094 filed on Dec. 18, 2017, the entire contents of which is incorporated herein for all purposes by this reference.

BACKGROUND OF THE INVENTION

Field of the Invention

The present invention relates to a mild hybrid vehicle (or a mild hybrid electric vehicle), and more particularly, to a method for controlling a mild hybrid vehicle.

Description of Related Art

A hybrid electric vehicle utilizes both an internal combustion engine and a battery power source. The hybrid electric vehicle efficiently combines the torque of the internal combustion engine and the torque of a motor.

Hybrid electric vehicles may be categorized as either a hard type or a mild type according to a power sharing ratio between the engine and the motor. In the case of the mild type of hybrid electric vehicle (or a mild hybrid electric vehicle), a mild hybrid starter & generator (MHSG) configured to start the engine or generate electricity according to an output of the engine is used instead of an alternator. In the case of the hard type of hybrid electric vehicle, a driving motor configured for generating driving torque is used in addition to an integrated starter & generator (ISG) configured to start the engine or generate electricity.

The mild hybrid electric vehicle does not provide a driving mode in which torque of the MHSG is used for the main driving torque, but the MHSG may assist the torque of the engine according to the running state of the vehicle and may charge a battery (e.g., a 48 V battery) through regenerative braking. Accordingly, the fuel efficiency of the mild hybrid electric vehicle may be improved.

A vehicle may use a turbocharger to increase output of an engine without increasing volume of the engine. An exhaust gas rotates a turbine wheel of the turbocharger and a wheel of an air compressor connected to a shaft which is connected to the turbine wheel is rotated to provide a compressed air into the combustion chamber so that the turbocharger increases the output of the engine.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a method for controlling a mild hybrid vehicle which is configured for maintaining or reducing fuel injection and assisting torque of an engine by operating a starter-generator when temperature of a turbocharger exceeds a reference value because of continuous fuel injection for operating the engine.

An exemplary embodiment of the present invention may provide the method for controlling the mild hybrid vehicle, including: determining, by a controller, whether an engine of the mild hybrid vehicle operates based on a demand torque of a driver of the mild hybrid vehicle; determining, by the controller, a torque of a starter-generator of the mild hybrid vehicle that assists a torque of the engine according to the demand torque of the driver based on a temperature of a turbocharger of the mild hybrid vehicle when the engine is operated; and operating, by the controller, the starter-generator to assist the torque of the engine based on the determined torque of the starter-generator.

The torque of the starter-generator may increase when the temperature of the turbocharger is increased.

The determining of the torque of the starter-generator may include: determining, by the controller, whether a state of charge (SOC) value of a battery that supplies electric power to the starter-generator exceeds a reference value after receiving the temperature of the turbocharger. The controller may be configured to determine the torque of the starter-generator when it is determined that the SOC value of the battery exceeds the reference value.

The controller may be configured to determine that the starter-generator does not assist the torque of the engine and may control the engine to generate a torque corresponding to the demand torque of the driver when it is determined that the SOC value of the battery is less than or equal to the reference value.

The controller may prohibit fuel injection for an operation of the engine to stop the operation of the engine when the temperature of the turbocharger exceeds a temperature at which the turbocharger is burned and it is determined that the SOC value of the battery is less than or equal to the reference value.

The method for controlling the mild hybrid vehicle may further include: confirming, by the controller, that a vehicle including the starter-generator is the mild hybrid vehicle when the controller receives a signal corresponding to a first controller area network identification from the starter-generator to which the first controller area network identification is assigned.

The method for controlling the mild hybrid vehicle may further include: confirming, by the controller, that the vehicle including the starter-generator is the mild hybrid vehicle including the turbocharger when the controller receives a signal corresponding to a second controller area network identification from the turbocharger to which the second controller area network identification is assigned.

The method for controlling the mild hybrid vehicle according to the exemplary embodiment of the present invention may not limit demand torque of the driver of the vehicle using the engine torque assist by the starter-generator when temperature of an exhaust gas excessively rises due to the engine operation in the vehicle including the starter-generator.

Furthermore, the exemplary embodiment of the present invention may prevent overheating of the exhaust gas in advance using the engine torque assist by the starter-generator which is performed from a time when a temperature rise in the turbocharger due to the exhaust gas is detected. When a temperature of the turbocharger exceeds a temperature at which the turbocharger is burnt or damaged due to the exhaust gas according to the engine operation, the exemplary embodiment of the present invention may satisfy the driver's demand torque by assisting the engine torque using a maximum output of the starter-generator.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
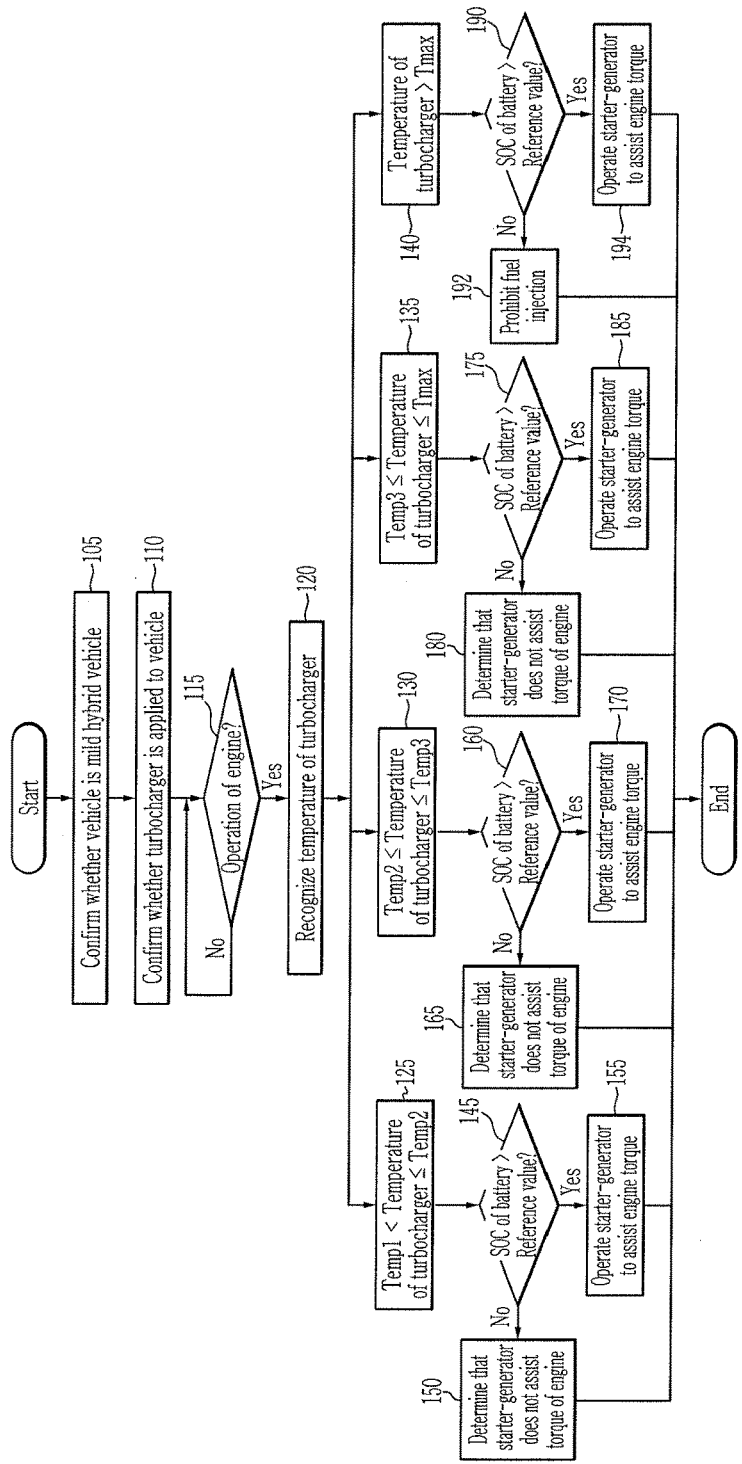
FIG. 1 is a flowchart illustrating a method for controlling a mild hybrid vehicle according to an exemplary embodiment of the present invention.

It may be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

In order to sufficiently understand the present invention and the object achieved by embodying the present invention, the accompanying drawings illustrating exemplary embodiments of the present invention and contents described in the accompanying drawings are to be referenced.

Hereinafter, the present invention will be described in detail by describing exemplary embodiments of the present invention with reference to the accompanying drawings. In describing the present invention, well-known configurations or functions will be omitted in detail since they may unnecessarily obscure the gist of the present invention. Throughout the accompanying drawings, the same reference numerals will be used to denote the same components.

Terms used in the present specification are only used in order to describe specific exemplary embodiments rather than limiting the present invention. Singular forms are to include plural forms unless the context clearly indicates otherwise. It will be further understood that the terms "include" or "have" used in the present specification specify the presence of features, numerals, steps, operations, components, or parts mentioned in the present specification, or a combination thereof, but do not preclude the presence or addition of one or more other features, numerals, steps, operations, components, parts, or a combination thereof.

Throughout this specification and the claims that follow, when it is described that an element is "coupled" to another element, the element may be "directly coupled" to the other element or "electrically or mechanically coupled" to the other element through a third element.

Unless defined otherwise, it is to be understood that the terms used in specification including technical and scientific terms have the same meanings as those that are generally understood by those skilled in the art. It must be understood that the terms defined by the dictionary are identical with the meanings within the context of the related art, and they should not be ideally or excessively formally defined unless the context clearly dictates otherwise.

A turbocharger is a system that utilizes an exhaust gas to drive a compressor and supercharges air into an intake port or an intake manifold, and is a device that requires high temperature thermal management. The exhaust gas may rotate an internal vane of the turbocharger to supply compressed air to an engine, which is a power source, but the turbocharger hardware may be burned out due to a high temperature exhaust gas.

A related art performs a torque limit of the engine when a temperature of the turbocharger exceeds a temperature upper limit so that an injection amount of fuel is further increased or a fuel amount is reduced to lower a temperature of the turbocharger. Therefore, even though a driver's demand torque is great, additional torque may not be increased to protect the turbocharger. In more detail, the related art may reduce the exhaust gas temperature by restricting the engine output to prevent the hardware burnout of the turbocharger when the temperature of the turbocharger excessively rises.

Figure 2:
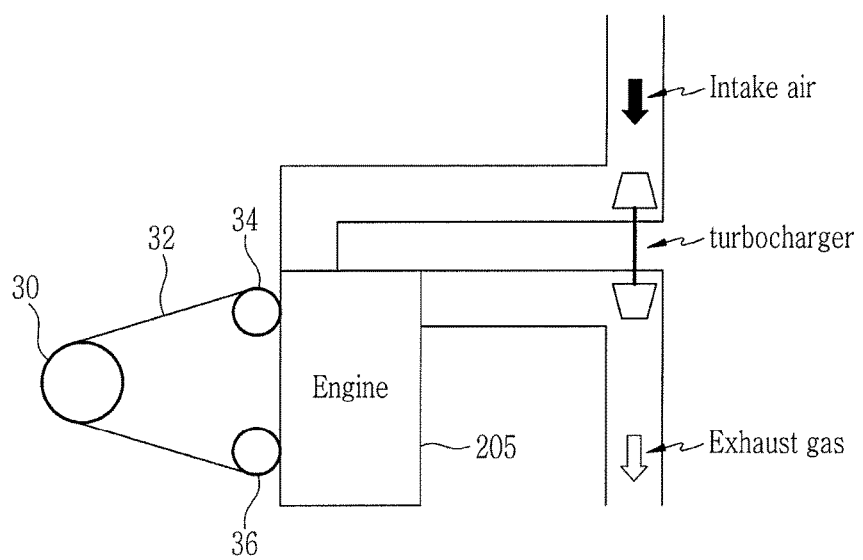
FIG. 2 is a view for explaining a step of confirming whether a turbocharger is applied to the vehicle which is shown in FIG. 1.
Figure 3:
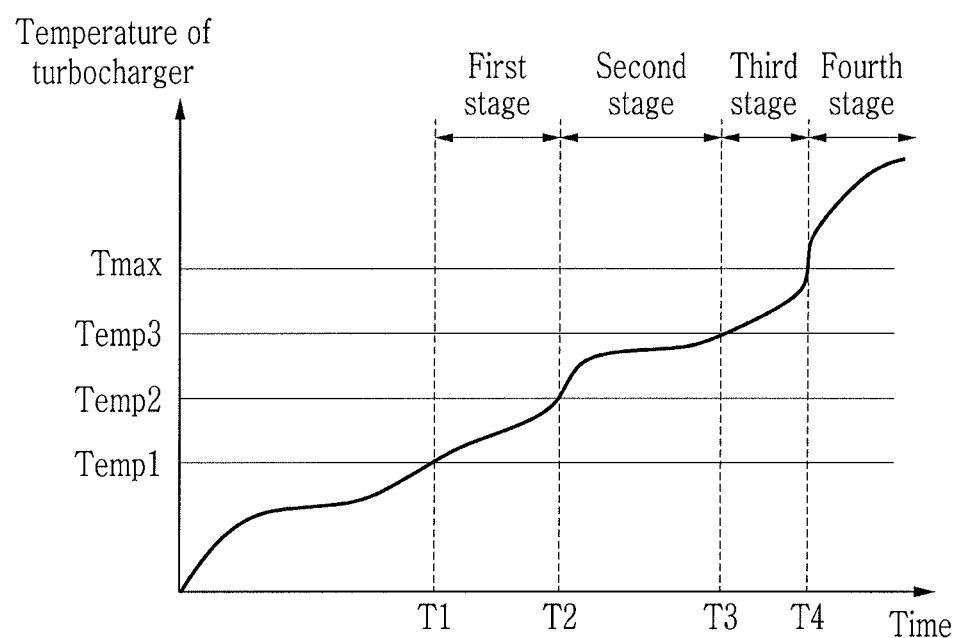
FIG. 3 and FIG. 4 are views illustrating a step of assisting an engine torque which is shown in FIG. 1.
Figure 4:
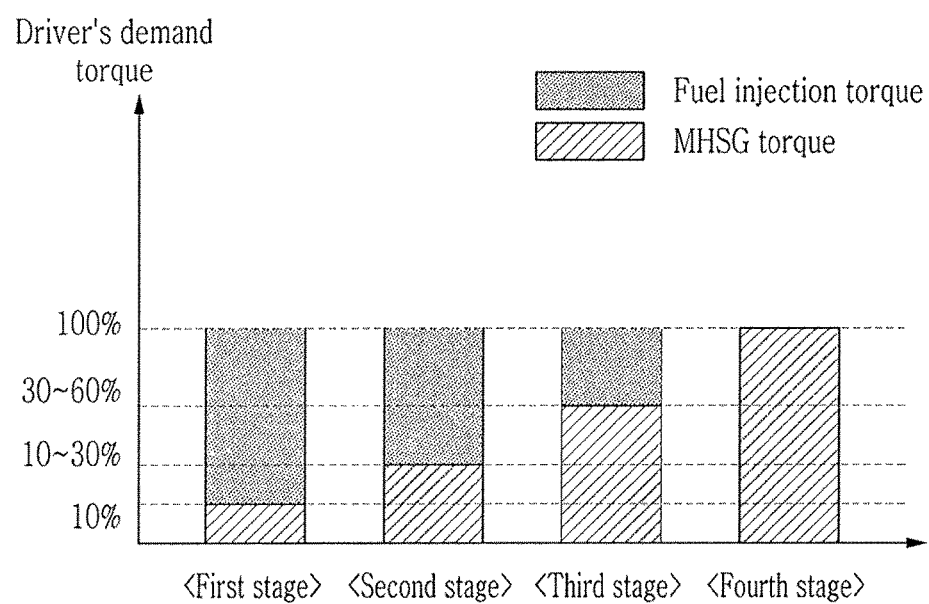
Figure 5:
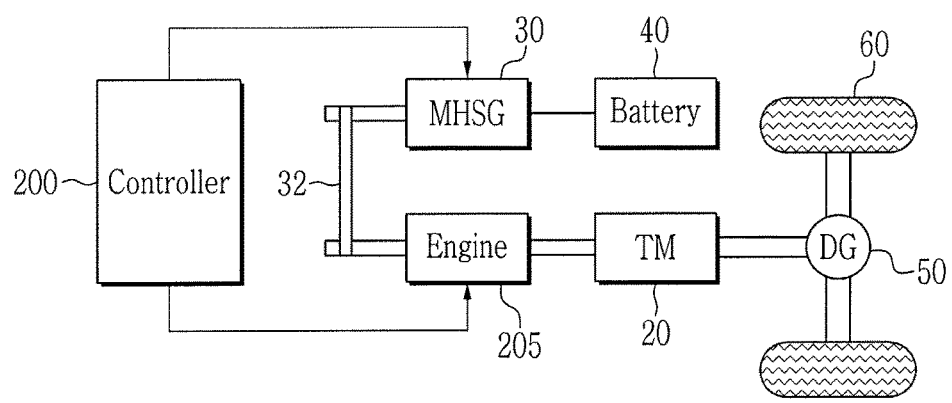
FIG. 5 is a block diagram illustrating a mild hybrid vehicle to which the method for controlling the mild hybrid vehicle shown in FIG. 1 is applied.

FIG. 1 is a flowchart illustrating a method for controlling a mild hybrid vehicle according to an exemplary embodiment of the present invention. FIG. 2 is a view for explaining a step of confirming whether a turbocharger is applied to the vehicle which is shown in FIG. 1. FIG. 3 and FIG. 4 are views illustrating a step of assisting an engine torque which is shown in FIG. 1. FIG. 5 is a block diagram illustrating a mild hybrid vehicle to which the method for controlling the mild hybrid vehicle shown in FIG. 1 is applied.

Referring to FIG. 1 to FIG. 5, in a confirmation step 105, a controller 200 may confirm or determine whether the vehicle is a mild hybrid vehicle. The controller 200 may be connected to a starter-generator (e.g., a mild hybrid starter and generator (MHSG)) 30 via a controller area network (CAN) which is a vehicle network. Accordingly, when the controller 80 receives a signal corresponding to an inherent CAN identification (ID) from the starter-generator 30 to which the inherent CAN ID which is a first CAN ID is assigned, the controller 80 may confirm that the vehicle to be controlled is the mild hybrid vehicle.

The controller 200 may control an overall operation of the mild hybrid vehicle. For example, the controller 200 such as an engine control unit (ECU) may be one or more microprocessors operated by a program or hardware including the microprocessor. The program may include a series of commands for executing the method for controlling the mild hybrid vehicle according to the exemplary embodiment of the present invention. The commands may be stored in a memory.

The mild hybrid vehicle includes an engine 205, a transmission 20, the starter-generator (or a mild hybrid starter and generator) 30, a battery 40, a differential gear device 50, wheels 60, the controller 200, and the turbocharger shown in FIG. 2.

The engine 205 may convert chemical energy to mechanical energy by combusting fuel and air. Torque of the engine 205 may be transmitted to an input shaft of the transmission 20, and a torque output from an output shaft of the transmission may be transmitted to an axle of the vehicle via the differential gear device 50. The axle may rotate the wheels 60 so that the mild hybrid vehicle may be driven.

The starter-generator 30 may convert electrical energy to mechanical energy or mechanical energy to electrical energy. In other words, the starter-generator 30 may start the engine 205 or generate electricity according to an output of the engine 205. Furthermore, the starter-generator 30 may assist the torque of the engine 205. The mild hybrid vehicle may use the torque of the starter-generator 30 as an auxiliary power while combustion torque of the engine 205 is a main power. The engine 205 and the starter-generator 30 may be connected via the belt 32 (or a pulley and a belt).

In the mild hybrid vehicle, the starter-generator 30 may be a portion performing functions of an alternator, the engine torque assist, or regenerative braking.

The starter-generator 30 may drive the engine 205 of the vehicle in a cranking and a torque control mode of the vehicle (or the engine) and may generate electricity according to an output of the engine to charge the 48 V battery 40 using an inverter in an electricity generation mode of the vehicle. The starter-generator 30 may operate in an operating mode in accordance with a driving state of the vehicle. The operating mode may include an engine starting mode, an engine torque assist mode for assisting torque of the engine by operating as a motor, a mode for charging the 48 V battery charging the 12 V battery which is connected to the 48 V battery via the LDC, a regenerative braking mode for charging the 48 V battery, or an inertial driving mode for extending a mileage of the vehicle. The starter-generator 30 may be optimally controlled according to the driving state of the vehicle to increase fuel efficiency of the vehicle.

The battery 40 may supply electricity to the starter-generator 30 or may be charged by electricity collected through the starter-generator 30 in a regenerative braking mode of the vehicle. The battery 40 may be a 48 V battery. The mild hybrid vehicle may further include a low voltage DC-DC converter (LDC) that converts voltage supplied from the battery 40 to a low voltage and a 12 V battery that supplies the low voltage to an electric load of the vehicle.

According to a confirmation step 110, the controller 200 may confirm or determine whether the turbocharger shown in FIG. 2 is disposed in the vehicle. In FIG. 2, a reference numeral 34 indicates a camshaft included in an auxiliary machinery of the engine 205 and a reference numeral 36 indicates a crankshaft included in the auxiliary machinery of the engine.

The controller 200 may be connected to the turbocharger via the CAN. Accordingly, when the controller 80 receives a signal corresponding to an inherent CAN ID from the turbocharger to which the inherent CAN ID which is a second CAN ID is assigned, the controller 80 may confirm that the vehicle to be controlled is the mild hybrid vehicle including the turbocharger.

In another exemplary embodiment of the present invention, the confirmation step 105 and the confirmation step 110 may be omitted.

According to a determination step 115, the controller 200 may determine whether the engine 205 of the mild hybrid vehicle operates or runs according to a demand torque of a driver of the mild hybrid vehicle. For example, whether the engine 205 is operated may be detected by an engine operation sensor disposed in the engine and may be provided to the controller 200.

According to a step 120, the controller 200 may recognize or receive a temperature of the turbocharger when it is determined that the engine 205 is operated in the determination step 115. For example, the temperature of the turbocharger may be detected by a temperature sensor disposed in the turbocharger and may be provided to the controller 200.

According to a step 125, the controller 200 may confirm that the temperature of the turbocharger is equal to or greater than a first temperature Temp1 and equal to or less than a second temperature Temp2 due to an exhaust gas according to the engine operation. For example, as shown in FIG. 3 and FIG. 4, a range between the first temperature Temp1 and the second temperature Temp2 may correspond to a temperature range when the engine 205 takes charge of 90% of the driver's demand torque and the starter-generator 30 takes charge of 10% of the driver's demand torque. The range between the first temperature Temp1 and the second temperature Temp2 may be determined by a test to be stored in a memory.

According to a determination step 145, the controller 200 may determine whether a state of charge (SOC) value of the battery 40 that supplies electric power to the starter-generator 30 exceeds a reference value after receiving the temperature of the turbocharger.

According to a step 150, when it is determined that the SOC value of the battery 40 is equal to or less than the reference value, the controller 200 may determine that the starter-generator 30 does not assist a torque of the engine 205 and may control or adjust the torque of the engine to satisfy the required torque of the driver.

According to a step 155, when it is determined that the SOC value of the battery 40 exceeds the reference value, the controller 200 may determine a torque of the starter-generator 30 for assisting a torque of the engine 205 according to the driver's demand torque, and the controller 200 may operate the starter-generator 30 to assist the torque of the engine 205 based on the determined torque of the starter-generator.

According to a step 130, the controller 200 may confirm that the temperature of the turbocharger is equal to or greater than the second temperature Temp2 and equal to or less than a third temperature Temp3 due to an exhaust gas according to the engine operation. For example, as shown in FIG. 3 and FIG. 4, a range between the second temperature Temp2 and the third temperature Temp3 may correspond to a temperature range when the engine 205 takes charge of 70% to 90% of the driver's demand torque and the starter-generator 30 takes charge of 10% to 30% of the driver's demand torque. The range between the second temperature Temp2 and the third temperature Temp3 may be determined by a test to be stored in the memory.

According to a determination step 160, the controller 200 may determine whether a state of charge (SOC) value of the battery 40 that supplies electric power to the starter-generator 30 exceeds the reference value after receiving the temperature of the turbocharger.

According to a step 165, when it is determined that the SOC value of the battery 40 is equal to or less than the reference value, the controller 200 may determine that the starter-generator 30 does not assist a torque of the engine 205 and may control or adjust the torque of the engine to satisfy the required torque of the driver.

According to a step 170, when it is determined that the SOC value of the battery 40 exceeds the reference value, the controller 200 may determine a torque of the starter-generator 30 for assisting a torque of the engine 205 according to the driver's demand torque, and the controller 200 may operate the starter-generator 30 to assist the torque of the engine 205 based on the determined torque of the starter-generator.

According to a step 135, the controller 200 may confirm that the temperature of the turbocharger is equal to or greater than the third temperature Temp3 and equal to or less than a turbocharger hardware protection temperature Tmax due to an exhaust gas according to the engine operation. The turbocharger hardware protection temperature Tmax may refer to a temperature at which the turbocharger is overheated by an exhaust gas according to the engine operation so that the turbocharger is be burned (or damaged). For example, as shown in FIG. 3 and FIG. 4, a range between the third temperature Temp3 and the turbocharger hardware protection temperature Tmax may correspond to a temperature range when the engine 205 takes charge of 40% to 70% of the driver's demand torque and the starter-generator 30 takes charge of 30% to 60% of the driver's demand torque. The range between the third temperature Temp3 and the turbocharger hardware protection temperature Tmax may be determined by a test to be stored in the memory.

According to a determination step 175, the controller 200 may determine whether a state of charge (SOC) value of the battery 40 exceeds the reference value after receiving the temperature of the turbocharger.

According to a step 180, when it is determined that the SOC value of the battery 40 is equal to or less than the reference value, the controller 200 may determine that the starter-generator 30 does not assist a torque of the engine 205 and may control or adjust the torque of the engine to satisfy the required torque of the driver.

According to a step 185, when it is determined that the SOC value of the battery 40 exceeds the reference value, the controller 200 may determine a torque of the starter-generator 30 for assisting a torque of the engine 205 according to the driver's demand torque, and the controller 200 may operate the starter-generator 30 to assist the torque of the engine 205 based on the determined torque of the starter-generator.

According to a step 140, the controller 200 may confirm that the temperature of the turbocharger exceeds the turbocharger hardware protection temperature Tmax due to an exhaust gas according to the engine operation. For example, as shown in FIG. 3 and FIG. 4, a range of temperatures exceeding the turbocharger hardware protection temperature Tmax may correspond to a temperature range when the engine 205 takes charge of 0% of the driver's demand torque (i.e., the engine 205 is not responsible for the driver's demand torque) and the starter-generator 30 takes charge of 100% of the driver's demand torque. The range of temperatures exceeding the turbocharger hardware protection temperature Tmax may be determined by a test to be stored in the memory.

According to a determination step 190, the controller 200 may determine whether a state of charge (SOC) value of the battery 40 exceeds the reference value after receiving the temperature of the turbocharger.

According to a step 192, when it is determined that the SOC value of the battery 40 is less than or equal to the reference value, the controller 200 may determine that the starter-generator 30 does not assist the torque of the engine 205 so that the controller is configured to prohibit fuel injection for operating the engine to stop an operation of the engine.

In another exemplary embodiment of the step 192, the controller 200 may determine that the starter-generator 30 does not assist a torque of the engine 205 so that the controller limits an injection amount of fuel for operation of the engine to prevent temperature rise of the turbocharger.

According to a step 194, when it is determined that the SOC value of the battery 40 exceeds the reference value, the controller 200 may determine a torque (e.g., a maximum torque) of the starter-generator 30 for assisting a torque of the engine 205 according to the driver's demand torque, and the controller 200 may operate the starter-generator 30 to assist the torque of the engine 205 based on the determined torque of the starter-generator.

Referring to FIG. 3 and FIG. 4, when a temperature of the turbocharger is increased, a torque of the starter-generator 30 may increase.

The components, "~unit", block, or module which are used in the present exemplary embodiment of the present invention may be implemented in software such as a task, a class, a subroutine, a process, an object, an execution thread, or a program which is performed in a predetermined region in the memory, or hardware such as a field programmable gate array (FPGA) or an application-specific integrated circuit (ASIC), and may be performed with a combination of the software and the hardware. The components, '~part', or the like may be embedded in a computer-readable storage medium, and some part thereof may be dispersedly distributed in a plurality of computers.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A method for controlling a mild hybrid vehicle, the method comprising:
    determining, by a controller, whether an engine of the mild hybrid vehicle operates based on a demand torque of a driver of the mild hybrid vehicle;
    determining, by the controller, a torque of a starter-generator of the mild hybrid vehicle that assists a torque of the engine according to the demand torque of the driver based on a temperature of a turbocharger of the mild hybrid vehicle when the engine is operated; and operating, by the controller, the starter-generator to assist the torque of the engine based on the determined torque of the starter-generator.

2. The method of claim 1, wherein the torque of the starter-generator increases when the temperature of the turbocharger is increased.

3. The method of claim 1, wherein the determining of the torque of the starter-generator includes:
   determining, by the controller, whether a state of charge (SOC) value of a battery that supplies electric power to the starter-generator exceeds a reference value after receiving the temperature of the turbocharger,
   wherein the controller is configured to determine the torque of the starter-generator when the SOC value of the battery is determined by the controller to exceed the reference value.

4. The method of claim 3, wherein, when the SOC value of the battery is determined by the controller to be less than or equal to the reference value, the controller is configured to determine that the starter-generator does not assist the torque of the engine and is configured to control the engine to generate a torque corresponding to the demand torque of the driver.

5. The method of claim 3, wherein, when the temperature of the turbocharger is determined by the controller to exceed a temperature at which the turbocharger is burned and the SOC value of the battery is determined by the controller to be less than or equal to the reference value, the controller is configured to prohibit fuel injection to the engine for an operation of the engine to stop the operation of the engine.

6. The method of claim 1, wherein the determining of the torque of the starter-generator includes:
   determining, by the controller, whether a state of charge (SOC) value of a battery that supplies electric power to the starter-generator exceeds a reference value after receiving the temperature of the turbocharger and having determined that the received temperature is within a predetermined range,
   wherein the controller is configured to determine the torque of the starter-generator when the controller determines that the SOC value of the battery exceeds the reference value.

7. The method of claim 6, wherein, when the SOC value of the battery is determined by the controller to be is less than or equal to the reference value, the controller is configured to determine that the starter-generator does not assist the torque of the engine and is configured to control the engine to generate a torque corresponding to the demand torque of the driver.

8. The method of claim 7, wherein, when the temperature of the turbocharger exceeds a maximum value of the predetermined range, the maximum value at which the turbocharger is burned, and when the SOC value of the battery is determined by the controller to be is less than or equal to the reference value, the controller is configured to prohibit fuel injection to the engine for an operation of the engine to stop the operation of the engine.

9. The method of claim 1, further including:
   confirming, by the controller, that a vehicle including the starter-generator is the mild hybrid vehicle when the controller receives a signal corresponding to a first controller area network identification from the starter-generator to which the first controller area network identification is assigned.

10. The method of claim 9, further including:
    confirming, by the controller, that the vehicle including the starter-generator is the mild hybrid vehicle including the turbocharger when the controller receives a signal corresponding to a second controller area network identification from the turbocharger to which the second controller area network identification is assigned.

* * * * *